US010736253B2

(12) United States Patent
Goulet et al.

(10) Patent No.: US 10,736,253 B2
(45) Date of Patent: Aug. 11, 2020

(54) HITCH FOR CONNECTING AN IMPLEMENT TO A VEHICLE

(71) Applicant: Rad Technologies Inc, Thetford Mines (CA)

(72) Inventors: Denis Goulet, Saint-Pierre-de-Broughton (CA); Louis Lamontagne, Thetford Mines (CA)

(73) Assignee: RAD TECHNOLOGIES INC., Thetford Mines (CA)

( * ) Notice: Subject to any disclaimer, the term of this patent is extended or adjusted under 35 U.S.C. 154(b) by 495 days.

(21) Appl. No.: 15/414,687

(22) Filed: Jan. 25, 2017

(65) Prior Publication Data

US 2017/0215326 A1 Aug. 3, 2017

Related U.S. Application Data

(60) Provisional application No. 62/288,578, filed on Jan. 29, 2016.

(51) Int. Cl.
*A01B 59/042* (2006.01)
*A01B 59/06* (2006.01)

(52) U.S. Cl.
CPC .......... *A01B 59/042* (2013.01); *A01B 59/062* (2013.01)

(58) Field of Classification Search
CPC .... A01B 59/042; A01B 59/062; A01B 59/063
USPC .................................... 172/275; 37/232, 235
See application file for complete search history.

(56) References Cited

U.S. PATENT DOCUMENTS

| 3,048,228 | A | | 8/1962 | Hess et al. |
| 3,173,496 | A | | 3/1965 | Annat |
| 3,351,357 | A | * | 11/1967 | Van Eaton ........... A01B 59/042 172/248 |
| 3,987,562 | A | * | 10/1976 | Deen et al. ............... E01H 5/06 37/231 |
| 5,029,650 | A | | 7/1991 | Smit |
| 5,125,174 | A | * | 6/1992 | Watson et al. .......... E01H 5/066 37/231 |
| 5,568,694 | A | * | 10/1996 | Capra et al. ............. E01H 5/06 37/231 |
| 6,178,669 | B1 | * | 1/2001 | Quenzi et al. ............ E01H 5/06 172/275 |
| 6,526,677 | B1 | * | 3/2003 | Bloxdorf et al. ......... E01H 5/06 37/231 |
| 6,618,964 | B2 | * | 9/2003 | Kost et al. ................ E01H 5/06 172/273 |
| 7,841,110 | B2 | * | 11/2010 | Koch et al. ............... E01H 5/06 172/272 |

* cited by examiner

*Primary Examiner* — Thomas B Will
*Assistant Examiner* — Joel F. Mitchell
(74) *Attorney, Agent, or Firm* — IP Delta Plus Inc.

(57) ABSTRACT

A hitch for connecting an implement to a vehicle. The hitch comprises a first frame for attachment to the vehicle and a second frame for attachment to the implement. The hitch further comprises a mechanism for connecting the first frame to the second frame. The connection of the first frame to the second frame provides for connecting the implement to the vehicle when the first frame is attached to the vehicle and the second frame is attached to the implement.

13 Claims, 11 Drawing Sheets

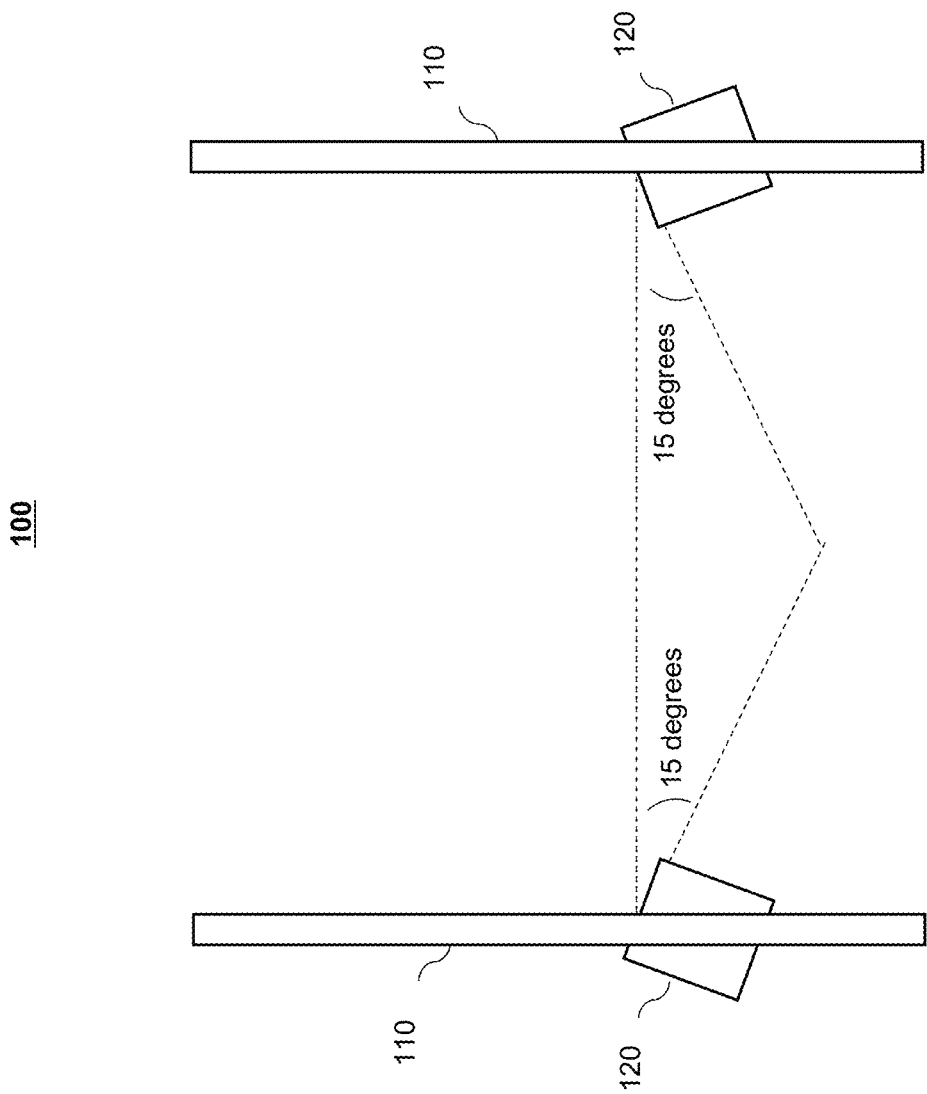

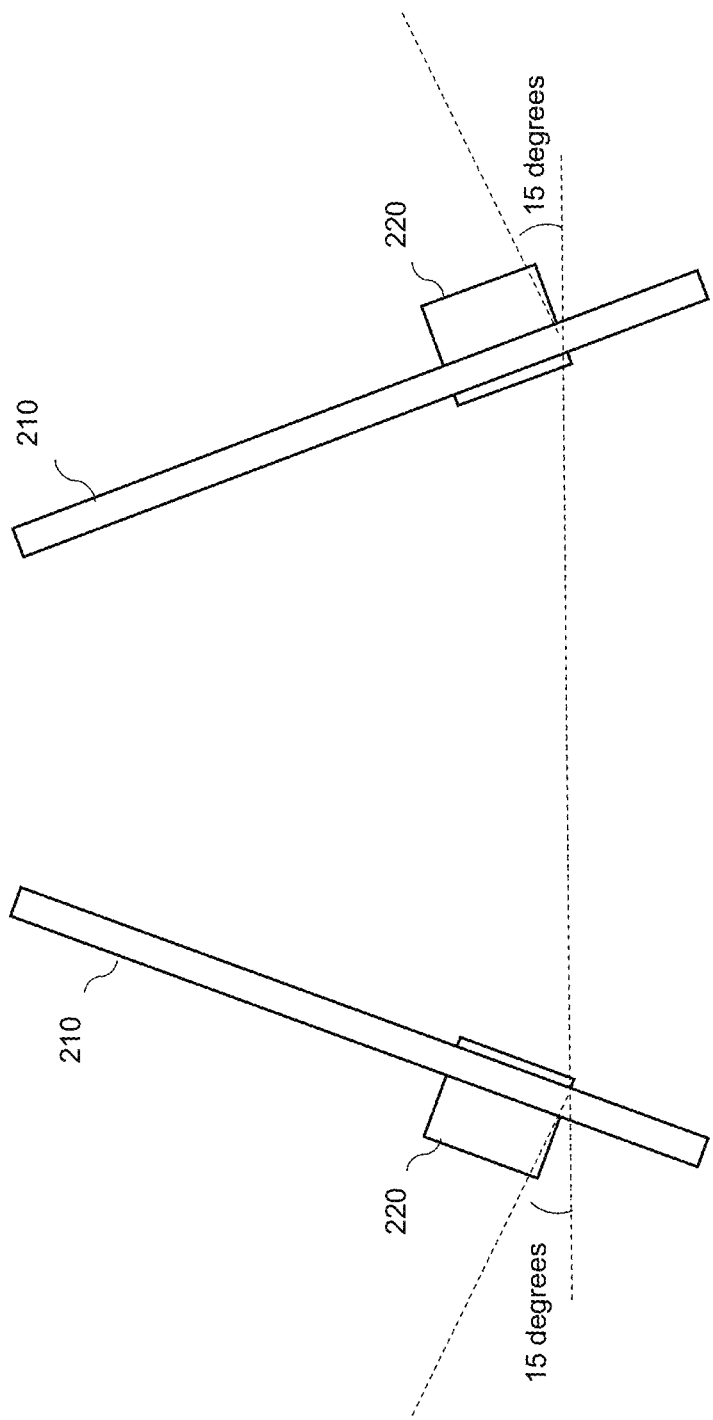

HITCH FOR CONNECTING AN IMPLEMENT TO A VEHICLE

TECHNICAL FIELD

The present disclosure relates to the field of hitches allowing connection of an implement to a vehicle, and more particularly to a hitch designed for facilitating the connection of the hitch to the vehicle.

BACKGROUND

The industry of vehicles adapted to receive implements, and the industry of implements themselves are both quite vast. It goes from residential, commercial and industrial applications. Examples of vehicles adapted to receive implements include tractors, trucks, all-terrain vehicles and heavy machinery. The variety of implements is wide since each implement usually corresponds to a particular task to be performed. Non-restrictive examples of implements include rotary-cutter, post-hole-digger and finish mower.

A system specifically designed for connecting an implement to a vehicle is generally used. The system may consist of a three-point hitch comprising three links for connecting the implement to the vehicle. Alternatively, the system may consist of a four-point hitch comprising four links for connecting the implement to the vehicle. A common design for a four-point hitch comprises two lower links and two upper links, each link being connected at one end with the implement and at the other end with the vehicle.

Although a plurality of designs for implementing a hitch are known in the art, most of these designs are not intended to facilitate the operation of attachment of the implement to the vehicle, which may lead to a degradation of the hitch and/or the implement if the operation of attachment is not performed accurately. For instance, the operation of attachment can be performed in various operating conditions, on various types of grounds, in various climatic conditions, which may render the operation of attachment more delicate and more prone to a failure.

There is therefore a need for a new hitch for connecting an implement to a vehicle, which facilitates the operation of connection.

SUMMARY

According to an aspect, the present disclosure relates to a hitch for connecting an implement to a vehicle. The hitch comprises a first frame for attachment to the vehicle, a second frame for attachment to the implement, and a pair of locking mechanisms. The first frame comprises a pair of substantially L-shaped parallel elongated members fixedly connected together. Each of the elongated members comprises a first extremity for attaching to the vehicle, a second extremity defining an internally substantially cylindrical wall, and a third extremity projecting vertically from the second extremity and defining an upper male connector. Each wall projects internally from and downwardly between the pair of elongated members. The second frame comprises a pair of complementary linkage members fixedly connected together. Each of the linkage members comprises a first extremity defining an upper female connector for receiving one of the upper male connectors. Each of the linkage members also comprises a second extremity defining an internally substantially cylindrical wall projecting externally from and upwardly away from the pair of complementary linkage members. The second frame also comprises an attachment for attaching the second frame to the implement. Each locking mechanism is configured for engaging one of the walls of the second frame and a corresponding wall of the first frame when the upper female connectors of the second frame receive the upper male connectors of the first frame.

BRIEF DESCRIPTION OF THE DRAWINGS

Embodiments of the disclosure will be described by way of example only with reference to the accompanying drawings, in which:

FIGS. 7A, 7B and 7C illustrate a particular configuration of the first and second frames represented in FIGS. 1B and 2B.

DETAILED DESCRIPTION

The foregoing and other features will become more apparent upon reading of the following non-restrictive description of illustrative embodiments thereof, given by way of example only with reference to the accompanying drawings. Like numerals represent like features on the various drawings.

Various aspects of the present disclosure generally address the design of a hitch for connecting an implement to a vehicle, the particular design facilitating the operation of connection.

Referring now concurrently to FIGS. 1A, 1B, 2A and 2B, a hitch for connecting an implement to a vehicle is illustrated.

The hitch comprises a first frame 100 for attachment to the vehicle and a second frame 200 for attachment to the implement. The first frame 100 is represented in a perspective view in FIG. 1A and in a front view in FIG. 1B. The first frame 100 comprises a pair of substantially L-shaped parallel elongated members 110 fixedly connected together.

Figure 1A:
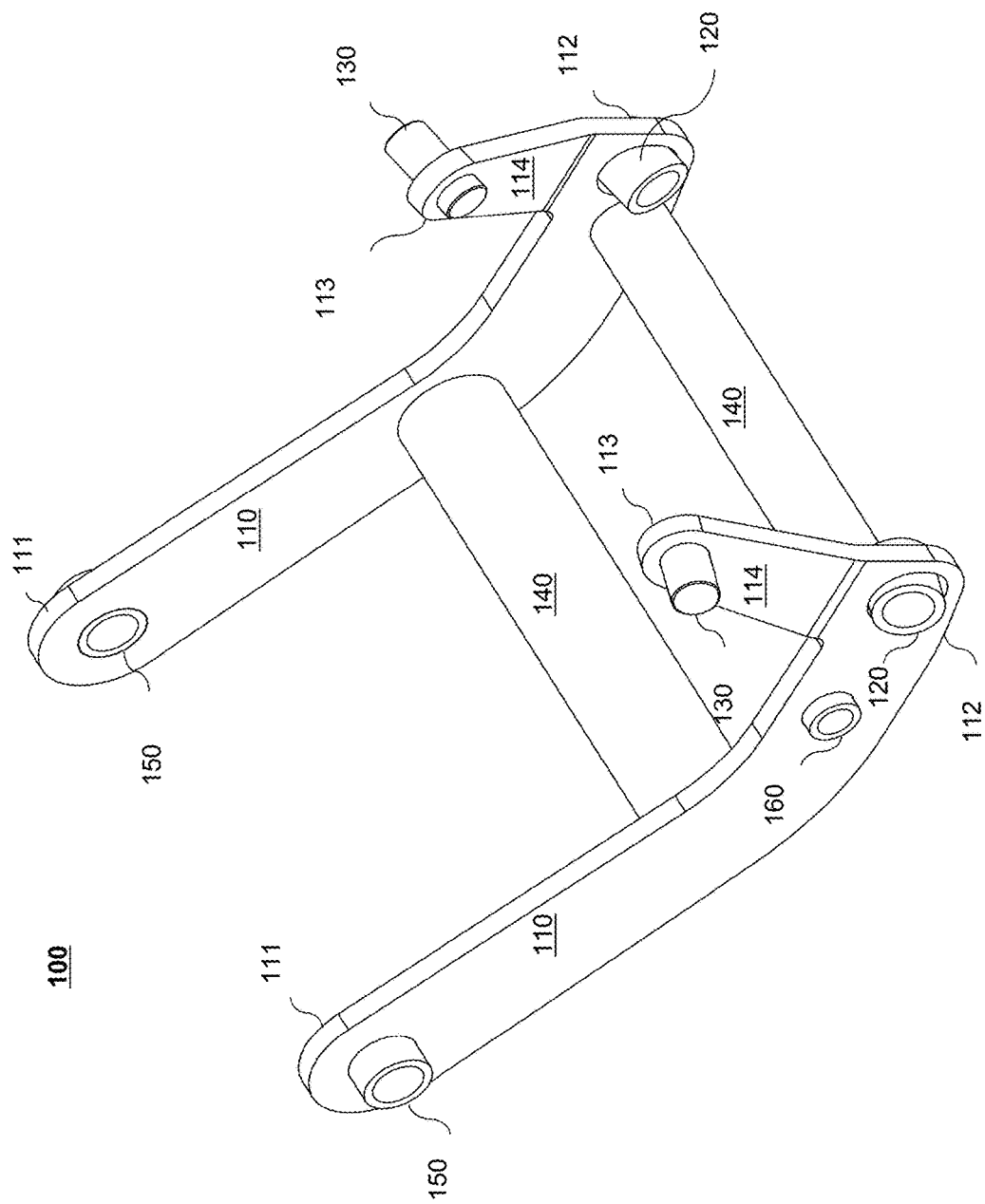
FIG. 1A illustrates a perspective view of a first frame of a hitch for connecting an implement to a vehicle.
Figure 1B:
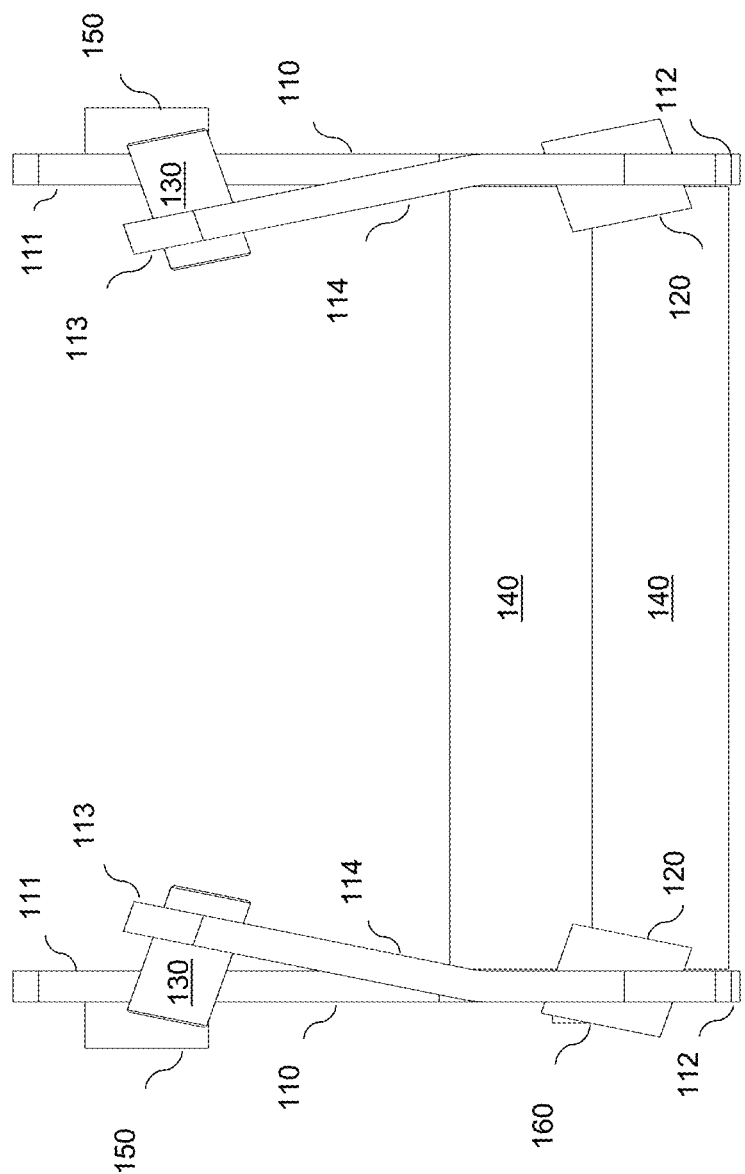
FIG. 1B illustrates a front view of the first frame of FIG. 1A.

Each of the elongated members 110 comprises a first extremity 111 for attaching to the vehicle (not represented in FIGS. 1A and 1B for simplification purposes).

Each of the elongated members 110 also comprises a second extremity 112 defining an internally substantially cylindrical wall 120. Each cylindrical wall 120 projects internally from and downwardly between the pair of elongated members 110. As illustrated in FIGS. 1A and 1B, each cylindrical wall 120 may also project externally and upwardly from the pair of elongated members 110. The cylindrical walls 120 may be integral to the elongated members 110. Alternatively, the cylindrical walls 120 are secured to the elongated members 110, for instance by means of welding. In the embodiment illustrated in FIGS. 1A and 1B, the cylindrical walls 120 may be a distinct part extending through an opening in the elongated members 110, and secured to the elongated members 110 by means of welding.

Each of the elongated members 110 further comprises a third extremity 113 projecting vertically from the second extremity 112, and defining an upper male connector 130. In a particular aspect illustrated in FIGS. 1A and 1B, each upper male connector 130 consists of a transverse pin projecting externally from the pair of elongated members 110. The transverse pins 130 may be integral to the elongated members 110. Alternatively, the transverse pins 130 are secured to the elongated members 110, for instance by means of welding. In the embodiment illustrated in FIGS. 1A and 1B, the transverse pins 130 extend through an opening in the elongated members 110, and also project internally between the pair of elongated members 110. The position, orientation, size and particular design of the upper male connectors 130 may vary substantially, and are only limited by the position, orientation, size and particular design of a corresponding pair of female connectors which will be described later in the description.

The pair of elongated members 110 are fixedly connected together by means of at least two transverse members 140 respectively extending between the pair of elongated members 110. Each extremity of the transverse members 140 is respectively connected to one of the pair of elongated members 110. The transverse members 140 may be integral to the elongated members 110. Alternatively, the transverse members 140 are secured to the elongated members 110, for instance by means of welding. For illustration purposes, FIGS. 1A and 1B represent two transverse members 140 of substantially cylindrical form, which may be hollow or full. However, the position, orientation, size and particular design of the transverse members 140 may vary substantially.

As shown in FIGS. 1A and 1B, a section 114 of the pair of elongated members 110 extending from the second extremity 112 to the third extremity 113 is oriented inwardly with respect to the pair of elongated members 110. The inwardly orientation of the third extremity 113 with respect to the second extremity 112 defines lateral clearance at the third extremity 113 with respect to the second extremity 112 for when the first frame 100 is inserted in the second frame 200.

The first extremity 111 of the pair of elongated members 110 defines one of the following: a male connector adapted for attachment to a corresponding female connector of the vehicle or a female connector adapted for attachment to a corresponding male connector of the vehicle. In the embodiment represented in FIGS. 1A and 1B for illustration purposes only, the first extremity 111 defines a female connector 150, which consists of an internally substantially cylindrical wall adapted for receiving a corresponding male connector of the vehicle (not represented in FIGS. 1A and 1B for simplification purposes). In this embodiment, one of the pair of elongated members 110 (the left one on FIG. 1A) further defines an additional female connector 160, which also consists of an internally substantially cylindrical wall adapted for receiving a corresponding male connector of the vehicle (not represented in FIGS. 1A and 1B for simplification purposes).

The various components of the first frame 100 (elongated members 110, cylindrical walls 120, male connectors 130, transverse members 140, male or female connectors 150, female connector 160, etc.) may be made of the same material or different materials. Example of such materials include one of the following: a metal, an alloy comprising one or more metals, etc.

The hitch also comprises a second frame 200 for attachment to the implement. The second frame 200 is represented in a perspective view in FIG. 2A and in a front view in FIG. 2B. The second frame 200 comprises a pair of complementary linkage members 210 fixedly connected together.

Each of the linkage members 210 comprises a first extremity 211 defining an upper female connector 230 for receiving one of the upper male connectors 130 of the first frame 100. Each upper female connector 230 consists of a downwardly-opening pin-receiving hook 230. The hooks 230 may be integral to the linkage members 210. Alternatively, the hooks 230 are secured to the linkage members 210, for instance by means of welding. The hooks 230 are adapted for receiving the transverse pins 130. The position, orientation, size and particular design of the upper female connectors 230 may vary substantially, and are only limited by the position, orientation, size and particular design of a corresponding pair of male connectors 130.

Each of the linkage members 210 also comprises a second extremity 212 defining an internally substantially cylindrical wall 220 projecting externally from and upwardly away from the pair of complementary linkage members 210. The cylindrical walls 220 may be integral to the linkage members 210. Alternatively, the cylindrical walls 220 are secured to the linkage members 210, for instance by means of welding. In the embodiment illustrated in FIGS. 2A and 2B, the walls 220 are a distinct part extending through an opening in the linkage members 210, and secured to the linkage members 210 by means of welding.

Figure 2A:
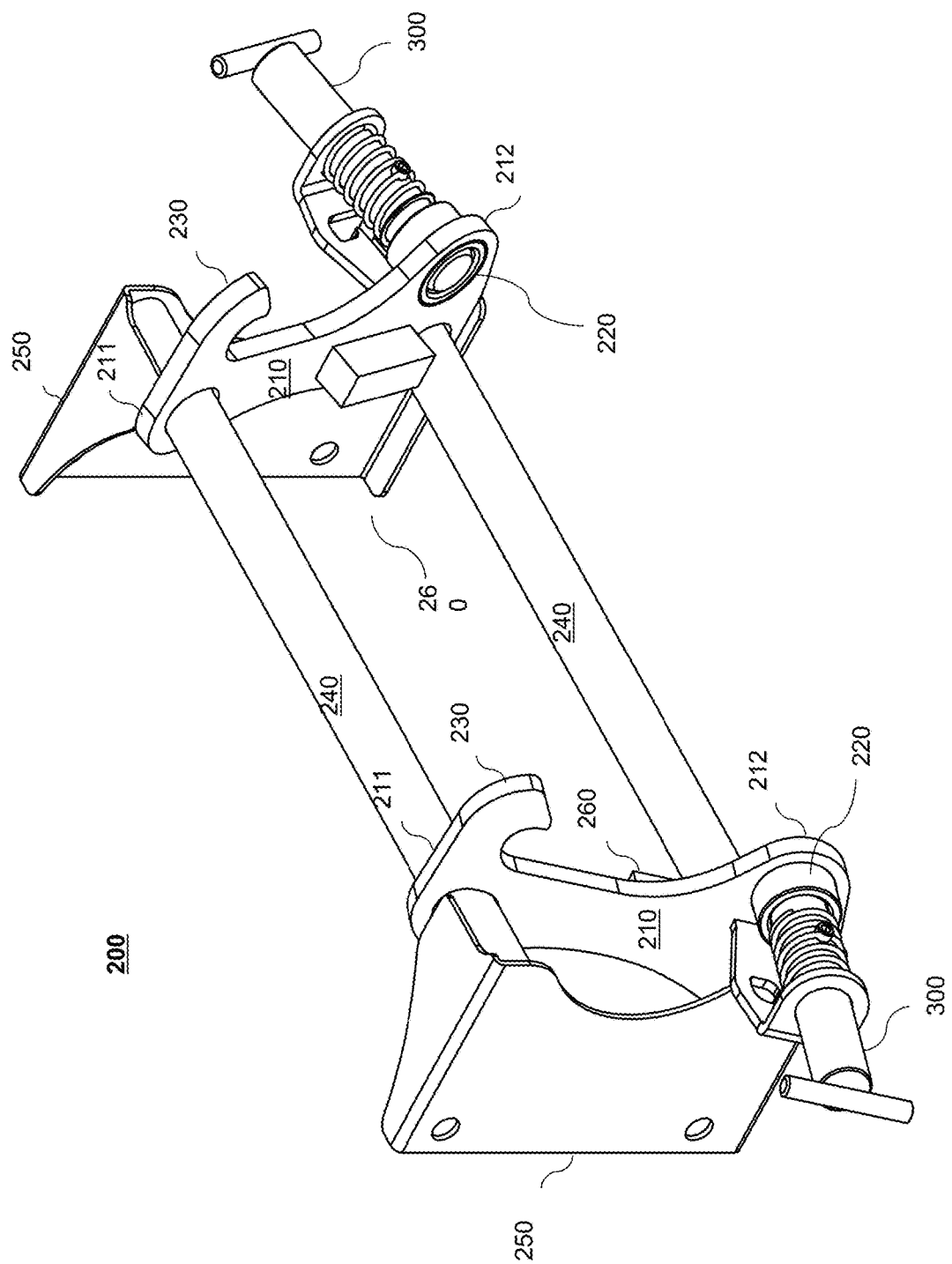
FIG. 2A illustrates a perspective view of a second frame of a hitch for connecting an implement to a vehicle.
Figure 2B:
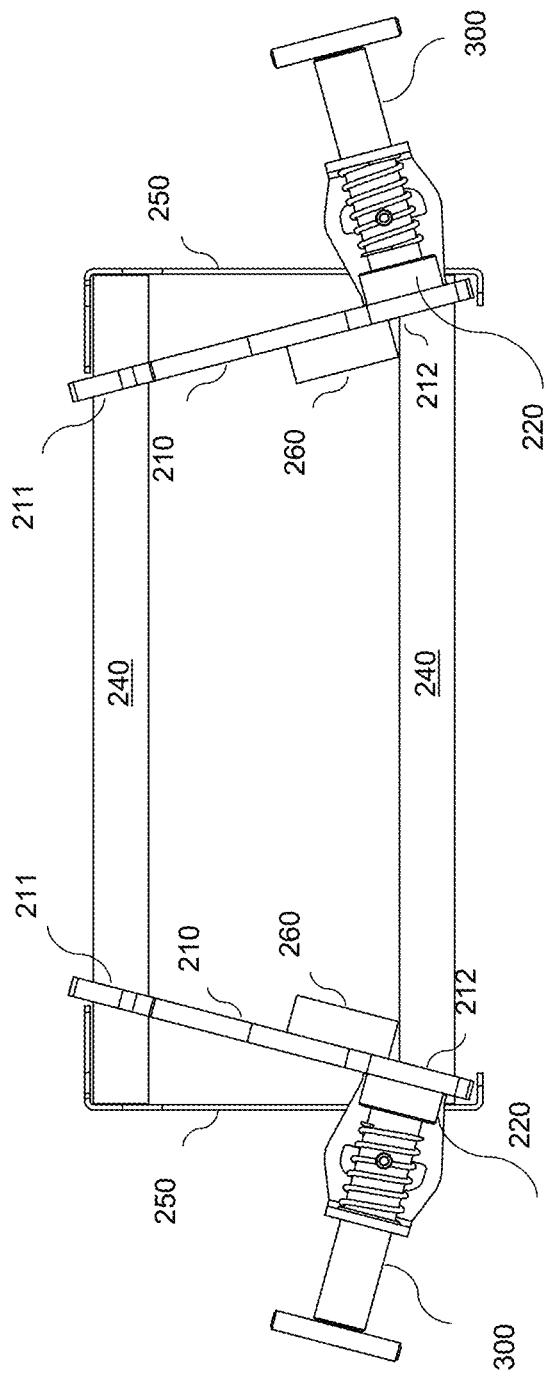
FIG. 2B illustrates a front view of the second frame of FIG. 2A.

The second frame 200 also comprises an attachment for attaching the second frame 200 to the implement (not represented in FIGS. 2A and 2B for simplification purposes). The attachment to the implement may be designed via various mechanisms known in the art. In FIGS. 2A and 2B, the attachment comprises a pair of attachment members 250. Each attachment member 250 is secured to one of the two linkage members 210, for instance by means of welding, of by any other means known in the art. Each attachment member 250 also defines attachment means known in the art for attachment to the implement. For instance, each attachment member 250 may define one or more female connectors (as illustrated in FIG. 2A) adapted for attachment to one or more corresponding male connectors of the implement. Alternatively, each attachment member 250 defines one or more male connectors adapted for attachment to one or more corresponding female connectors of the implement. The position, orientation, size and particular design of the female connectors (or male connectors) of the attachment members 250 may vary substantially, and are only limited by the position, orientation, size and particular design of the corresponding male connectors (or female connectors) of the implement. Similarly, the position, orientation, size and particular design of the attachment members 250 may vary substantially, and are only limited by the particular designs of the second frame 200 and implement.

In the aspect illustrated in FIGS. 2A and 2B, the pair of linkage members 210 are fixedly connected together by means of at least two transverse members 240 respectively extending between the pair of linkage members 210. Each extremity of the transverse members 240 is respectively connected to one of the pair of linkage members 210. The transverse members 240 may be integral to the linkage members 210. Alternatively, the transverse members 240 are secured to the linkage members 110, for instance by means of welding. For illustration purposes, FIGS. 2A and 2B represent two transverse members 240 of substantially cylindrical form, which may be hollow or full. However, the position, orientation, size and particular design of the transverse members 240 may vary substantially.

In the aspect illustrated in FIG. 2B, the pair of linkage members 210 are oriented inwardly with respect to one another.

The various components of the second frame 200 (linkage members 210, cylindrical walls 220, female connectors 230, transverse members 240, attachment members 250, etc.) may be made of the same material or different materials. Example of such materials include one of the following: a metal, an alloy comprising one or more metals, etc.

The hitch also comprises a pair of locking mechanisms 300 represented in FIGS. 2A and 2B. Each locking mechanism 300 is configured for engaging one of the cylindrical walls 220 of the second frame 200 and a corresponding cylindrical wall 120 of the first frame 100 when the upper female connectors 230 of the second frame 200 receive the upper male connectors 130 of the first frame 100.

Figure 3:
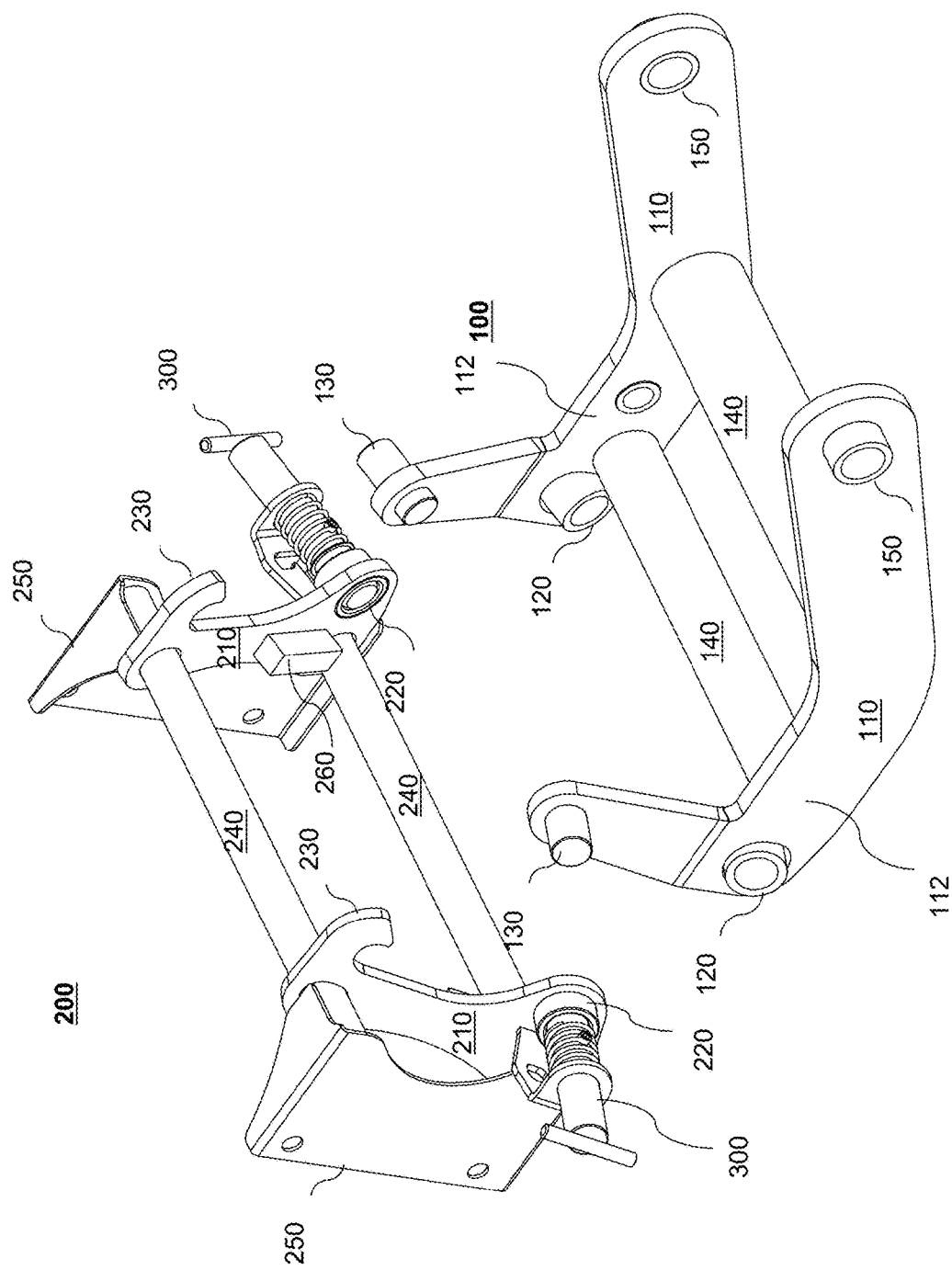
FIG. 3 illustrates the first frame of FIG. 1A and the second frame of FIG. 2A before connection to one another.
Figure 4:
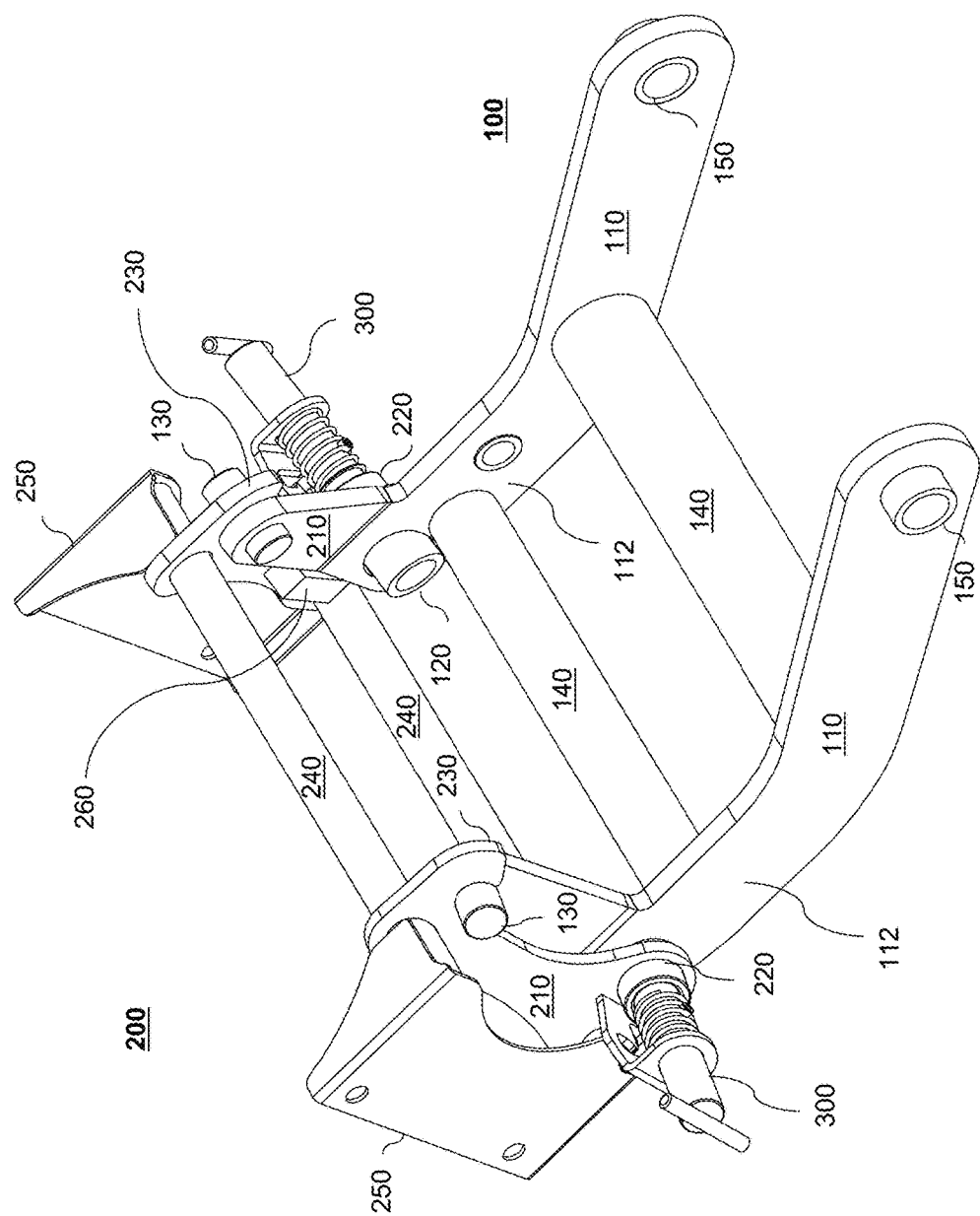
FIG. 4 illustrates the first frame of FIG. 1A and the second frame of FIG. 2A after connection to one another.

Reference is now made concurrently to FIGS. 3 and 4. FIG. 3 represents the first frame 100 and the second frame 200 before reception of the upper male connectors 130 of the first frame 100 by the upper female connectors 230 of the second frame 200. Each locking mechanism 300 has not engaged yet one of the cylindrical walls 220 of the second frame 200 and a corresponding cylindrical wall 120 of the first frame 100. FIG. 4 represents the first frame 100 and the second frame 200 after reception of the upper male connectors 130 of the first frame 100 by the upper female connectors 230 of the second frame 200. Each locking mechanism 300 has engaged one of the cylindrical walls 220 of the second frame 200 and a corresponding cylindrical wall 120 of the first frame 100.

In FIGS. 2A, 2B, 3 and 4, the pair of locking mechanisms 300 is secured to the second frame 200, by any means known in the art. Alternatively, the pair of locking mechanisms 300 may be secured to the first frame 100 (this embodiment is not illustrated in the Figures).

The pair of locking mechanisms 300 may consist in a pair of spring load pistons, as shown on the Figures. However, the pair of locking mechanisms 300 could consist of any type of mechanical locking mechanism known in the art, with or without springs.

When the upper female connectors 230 of the second frame 200 receive the upper male connectors 130 of the first frame 100, each locking mechanism 300 can engage one of the cylindrical walls 220 of the second frame 200 and a corresponding cylindrical wall 120 of the first frame 100 only when each of the cylindrical walls 220 of the second frame 200 are aligned with their respective corresponding cylindrical walls 120 of the first frame 100. This alignment occurs when the upper female connectors 230 of the second frame 200 receive the upper male connectors 130 of the first frame 100, and simultaneously the first frame 100 is positioned at a particular angle with respect to the second frame 200, the particular angle allowing each of the cylindrical walls 220 of the second frame 200 to be aligned with their respective corresponding cylindrical walls 120 of the first frame 100. The reception of the upper male connectors 130 of the first frame 100 by the upper female connectors 230 of the second frame 200 provides a rotational degree of liberty of the first frame 100 with respect to the second frame 200. This rotational degree of liberty allows positioning the first frame 100 at the particular angle with respect to the second frame 200. The particular angle corresponds to having each of the cylindrical walls 220 of the second frame 200 to be aligned with their respective corresponding cylindrical walls 120 of the first frame 100.

Each linkage member 210 comprises a stop 260 projecting internally between the pair of linkage members 210. The stops 260 are configured for allowing abutment of the first frame 100 against the stops 260 when the upper female connectors 230 of the second frame 200 receive the upper male connectors 130 of the first frame 100. The stops 260 may be integral to the linkage members 210. Alternatively, the stops 260 are secured to the linkage members 210, for instance by means of welding. The stops 260 are further configured so that when the abutment occurs, each of the cylindrical walls 220 of the second frame 200 are aligned with their respective corresponding cylindrical walls 120 of the first frame 100, therefore allowing engagement of each locking mechanism 300 with one of the cylindrical walls 220 of the second frame 200 and the corresponding cylindrical wall 120 of the first frame 100. The position, orientation, size and particular design of the stops 260 may vary substantially, and are only limited by the aforementioned function of the stops 260, which consists in providing abutment of the first frame 100 for allowing engagement of the locking mechanisms 300.

Figure 5:
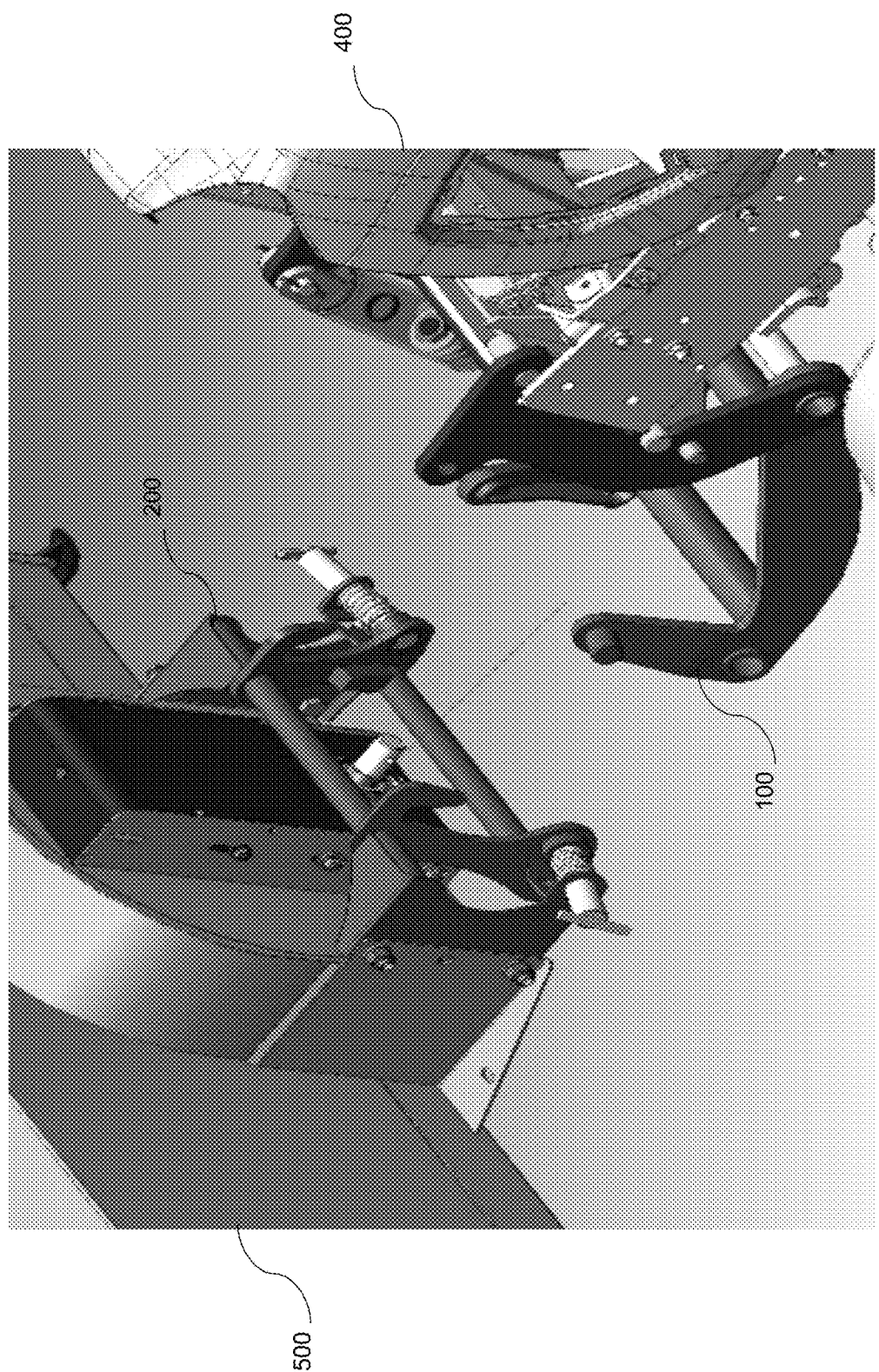
FIG. 5 illustrates a vehicle with the first frame of FIG. 1A and an implement with the second frame of FIG. 2A before connection to one another.
Figure 6:
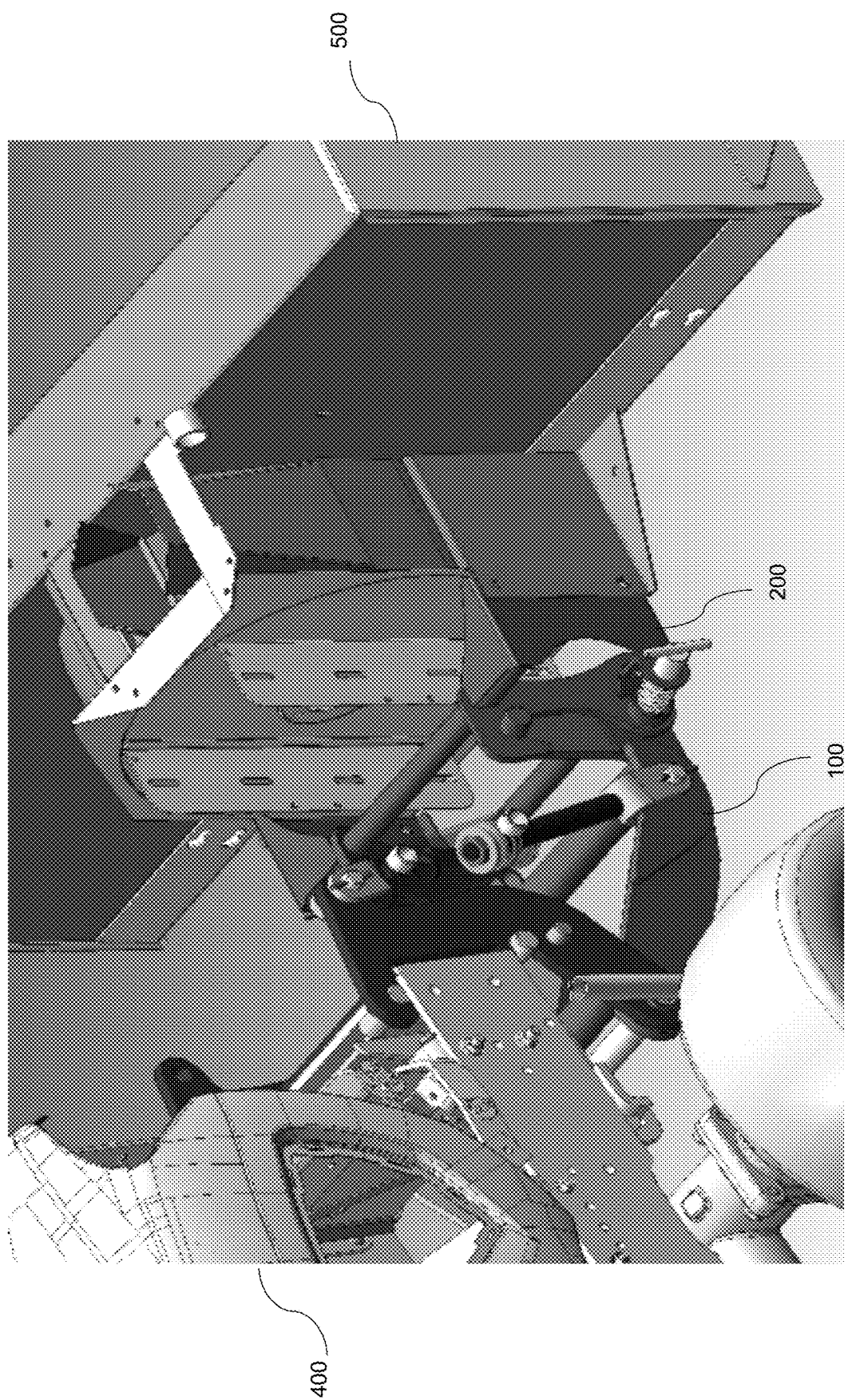
FIG. 6 illustrates the vehicle with the first frame of FIG. 1A and the implement with the second frame of FIG. 2A after connection to one another.

Reference is now made concurrently to FIGS. 3, 4, 5 and 6. FIG. 5 represents the first frame 100 and the second frame 200 of FIG. 3, before reception of the upper male connectors 130 of the first frame 100 by the upper female connectors 230 of the second frame 200. FIG. 5 further represents the first frame 100 being attached to a vehicle 400 and the second frame 200 being attached to an implement 500. FIG. 6 represents the first frame 100 and the second frame 200 of FIG. 4 after reception of the upper male connectors 130 of the first frame 100 by the upper female connectors 230 of the second frame 200. Each locking mechanism 300 has engaged one of the cylindrical walls 220 of the second frame 200 and the corresponding cylindrical wall 120 of the first frame 100. FIG. 6 further represents the first frame 100 being attached to the vehicle 400 and the second frame 200 being attached to the implement 500. The vehicle 400 and the implement 500 are only partially represented in FIGS. 5 and 6 for simplification purposes. The attachment of the first frame 100 to the vehicle 400 and the attachment of the second frame 200 to the implement 500 have already been detailed previously in relation to FIGS. 1A, 1B, 2A and 2B.

FIG. 6 illustrates the implement 500 connected to the vehicle 400 by means of the present hitch. The connection occurs when the first frame 100 is attached to the vehicle 400, the second frame 200 is attached to the implement 500, and when the upper male connectors 130 of the first frame 100 are received and engaged into the upper female connectors 230 of the second frame 200, and engagement of each locking mechanism 300 with one of the cylindrical walls 220 of the second frame 200 and the corresponding cylindrical wall 120 of the first frame 100.

Figure 7C:
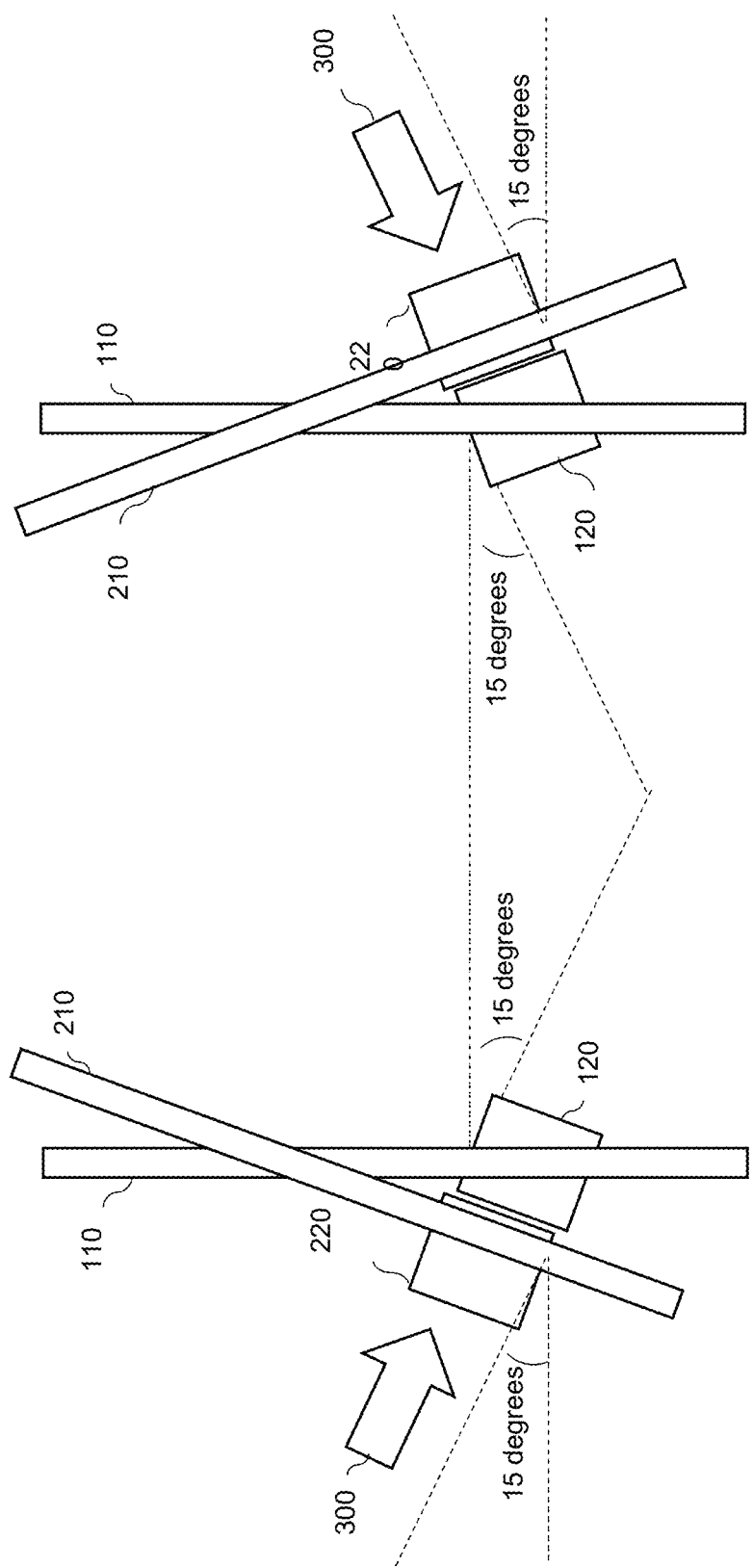

Reference is now concurrently made to FIGS. 3, 4, 5, 6, 7A, 7B and 7C. The cylindrical walls 120 of the first frame 100 project internally from and downwardly between the pair of elongated members 110 at an angle of substantially 15 degrees with respect to a horizontal reference and the cylindrical walls 220 of the second frame 200 project externally from and upwardly away from the pair of linkage members 210 at an angle of substantially 15 degrees with respect to a horizontal reference. FIG. 7A is a simplified representation of the first frame 100 corresponding to FIG. 1B, and illustrating the cylindrical walls 120 of the first frame 100 projecting internally from and downwardly between the pair of elongated members 110 at an angle of substantially 15 degrees with respect to a horizontal reference. FIG. 7B is a simplified representation of the second frame 200 corresponding to FIG. 2B, and illustrating the cylindrical walls 220 of the second frame 200 projecting externally from and upwardly away from the pair of linkage members 210 at an angle of substantially 15 degrees with respect to a horizontal reference. The angle of substantially 15 degrees has been experimentally determined to be an angle particularly adapted for facilitating the connection of the implement 500 to the vehicle 400. FIG. 7C is a simplified representation of the first frame 100 illustrated in FIG. 7A and the second frame 200 illustrated in FIG. 7B when respectively positioned in the configuration allowing connection of the implement 500 to the vehicle 400 via engagement of the pair of locking mechanisms 300 (represented by arrows for simplification purposes).

Reference is now made to FIGS. 3, 5 and 6. The second extremity 112 of each elongated member 110 of the first frame 100 is substantially horizontal to ground level when the first frame 100 is installed on a vehicle as shown on FIG. 5. The substantially horizontal orientation of the second extremity 112 of the first frame 100 further facilitates the connection of the implement 500 to the vehicle 400 when respectively attached to the second frame 200 and first frame 100 by providing a lateral clearance on each side of the first frame 100 with respect to the second frame 200 when the first frame 100 is lowered by a piston for positioning in the second frame 200. The lateral clearance facilitates the positioning of the first frame 100 with respect to the second frame 200. In operation, when the first frame 100 is attached to the tractor and the second frame 200 is attached to the implement, an operator of the tractor lowers the first frame 100 by use of the piston (shown on FIG. 6), and approaches the first frame 100 to the second frame 200. The inclination of the third extremity 114 of the L-shaped members 110 provides the lateral clearance between the lowered first frame 100 with respect to the second frame 200. When in position, the operator of the tractor raises the first frame 100 by use of the piston, into the second frame 200, thereby gradually reducing the lateral clearance between the first frame 100 and the second frame 200, and allowing smooth insertion of the upper male connectors 130 of the first frame 100 into the upper female connectors 230 of the second frame 200. When the upper male connectors 130 of the first frame are securely inserted into the upper female connectors 230 of the second frame, the second frame 200 is lifted and by gravity rotates the second frame 200 until the second extremities of the L-shaped parallel elongated members 110 are abutted against the stops 260 of the second frame. The operator may then actuate the pair of locking mechanisms 300 so as to lock the implement to the tractor.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A hitch for connecting an implement to a vehicle, the hitch comprising:
    a first frame for attachment to the vehicle, the first frame comprising:
        a pair of substantially L-shaped members fixedly connected together, each of the L-shaped members comprising:
            a first extremity for attaching to the vehicle, a second extremity defining an internally cylindrical wall, and a third extremity projecting upwardly from the second extremity, the third extremity defining an upper male connector projecting externally from the first frame and upwardly at an angle of 15 degrees with a horizontal reference, the internally cylindrical wall projecting internally from and downwardly between the pair of elongated members;
    a second frame for attachment to the implement, the second frame comprising:
        a pair of complementary linkage members fixedly connected together, each of the linkage members comprising:
            a first extremity defining an upper female connector for receiving one of the upper male connectors of the first frame, and
            a second extremity defining an internally cylindrical wall projecting externally from and upwardly away from the pair of complementary linkage members; and
        an attachment for attaching the second frame to the implement; and
    a pair of locking mechanisms, each locking mechanism being configured for engaging one of the cylindrical walls of the second frame and a corresponding cylindrical wall of the first frame when the upper female connectors of the second frame receive the upper male connectors of the first frame;
    wherein when the first frame is attached to the vehicle and the second frame is attached to the implement, the upper male connectors of the first frame are received by the upper female connectors of the second frame thereby aligning the cylindrical walls of the second frame to the cylindrical walls of the first frame, each locking mechanism engages one of the cylindrical walls of the second frame and the corresponding cylindrical wall of the first frame.

2. The hitch of claim 1, wherein each upper male connector of the first frame consists of a transverse pin projecting externally from the pair of elongated members, and each upper female connector of the second frame consists of a downwardly-opening pin-receiving hook adapted for engaging one of the transverse pins.

3. The hitch of claim 1, wherein the pair of elongated members are fixedly connected together by means of at least two transverse members respectively extending between the pair of elongated members.

4. The hitch of claim 1, wherein a section of the pair of elongated members extending from the second extremity to the third extremity is oriented inwardly with respect to the pair of elongated members.

5. The hitch of claim 1, wherein the first extremity of the pair of elongated members defines one of the following: a male connector adapted for attachment to a corresponding female connector of the vehicle, and a female connector adapted for attachment to a corresponding male connector of the vehicle.

6. The hitch of claim 1, wherein the pair of linkage members are fixedly connected together by means of at least two transverse members respectively extending between the pair of linkage members.

7. The hitch of claim 1, wherein the pair of linkage members are oriented inwardly with respect to one another.

8. The hitch of claim 1, wherein the attachment for attaching the second frame to the implement comprises a pair of attachment members, each attachment member being secured to one of the linkage members and defining attachment means for attachment to the implement.

9. The hitch of claim 8, wherein the attachment means comprises one of the following: one or more female connectors adapted for attachment to one or more corresponding male connectors of the implement, and one or more male connectors adapted for attachment to one or more corresponding female connectors of the implement.

10. The hitch of claim 1, wherein the pair of locking mechanisms is secured to the second frame.

11. The hitch of claim 1, wherein the pair of locking mechanisms consists in a pair of spring load pistons.

12. The hitch of claim 1, wherein each linkage member comprises a stop projecting internally between the pair of linkage members, the stops being configured for allowing abutment of the first frame against the stops when the upper female connectors of the second frame receive the upper male connectors of the first frame, the stops being further configured for allowing engagement of each locking mechanism with one of the walls of the second frame and the corresponding wall of the first frame when the abutment occurs.

13. A hitch for connecting an implement to a vehicle, the hitch comprising:
a first frame for attachment to the vehicle, the first frame comprising:
a pair of substantially L-shaped parallel elongated members fixedly connected together, each of the elongated members comprising:
a first extremity for attaching to the vehicle, a second extremity defining an internally substantially cylindrical wall, and a third extremity projecting vertically from the second extremity and defining an upper male connector, the internally substantially cylindrical wall projecting internally from and downwardly between the pair of elongated members;

a second frame for attachment to the implement, the second frame comprising:
a pair of complementary linkage members fixedly connected together, each of the linkage members comprising:
a first extremity defining an upper female connector for receiving one of the upper male connectors, and
a second extremity defining an internally substantially cylindrical wall projecting externally from and upwardly away from the pair of complementary linkage members; and
an attachment for attaching the second frame to the implement; and
a pair of locking mechanisms, each locking mechanism being configured for engaging one of the walls of the second frame and a corresponding wall of the first frame when the upper female connectors of the second frame receive the upper male connectors of the first frame;
wherein when the first frame is attached to the vehicle, the second frame is attached to the implement, the upper male connectors of the first frame are received by the upper female connectors of the second frame, and each locking mechanism is being actuated for engaging one of the walls of the second frame and the corresponding wall of the first frame, the walls of the first frame project internally from and downwardly between the pair of elongated members at a given angle of substantially 15 degrees with respect to a horizontal reference and the walls of the second frame project externally from and upwardly away from the pair of linkage members at the given angle with respect to a horizontal reference.

* * * * *